US008454291B2

(12) United States Patent
Guyomard

(10) Patent No.: US 8,454,291 B2
(45) Date of Patent: Jun. 4, 2013

(54) DEVICE FOR ATTACHING AN ELEMENT TO A HOLDER

(75) Inventor: Jean-Nicolas Guyomard, Le Mesnil Fuguet (FR)

(73) Assignee: Valeo Systems Thermiques S.A.S., Le Mesnil Saint Denis (FR)

( * ) Notice: Subject to any disclaimer, the term of this patent is extended or adjusted under 35 U.S.C. 154(b) by 1266 days.

(21) Appl. No.: 11/791,426

(22) PCT Filed: Dec. 14, 2005

(86) PCT No.: PCT/FR2005/003126
§ 371 (c)(1),
(2), (4) Date: Nov. 14, 2007

(87) PCT Pub. No.: WO2006/064122
PCT Pub. Date: Jun. 22, 2006

(65) Prior Publication Data
US 2009/0028661 A1    Jan. 29, 2009

(30) Foreign Application Priority Data
Dec. 14, 2004   (FR) ..................................... 04 13273

(51) Int. Cl.
*F16B 43/00*   (2006.01)
(52) U.S. Cl.
USPC .................. 411/546; 411/164; 403/408.1
(58) Field of Classification Search
USPC ............... 411/160, 162–165, 546; 403/408.1
See application file for complete search history.

(56) References Cited

U.S. PATENT DOCUMENTS

| 843,720 | A | * | 2/1907 | Waddell ......................... 16/417 |
| 1,824,991 | A | * | 9/1931 | Gribbie ......................... 411/165 |
| 1,909,475 | A | * | 5/1933 | Olson ........................... 411/148 |
| 2,102,495 | A |   | 12/1937 | England |
| 2,424,208 | A | * | 7/1947 | Poupitch ....................... 411/134 |
| 2,675,844 | A |   | 4/1954 | Knohl |
| 3,315,720 | A | * | 4/1967 | Gutshall ....................... 411/544 |
| 3,352,344 | A | * | 11/1967 | Lanius, Jr. .................... 411/145 |
| 3,687,184 | A | * | 8/1972 | Wagner ......................... 411/135 |
| 4,034,788 | A | * | 7/1977 | Melone ......................... 411/134 |
| 4,193,434 | A | * | 3/1980 | Wagner ......................... 411/154 |
| 4,238,165 | A | * | 12/1980 | Wagner ..................... 403/408.1 |
| 4,448,565 | A | * | 5/1984 | Peterson .................... 403/408.1 |
| 4,726,164 | A | * | 2/1988 | Reinwall et al. ................ 52/410 |
| 4,797,022 | A | * | 1/1989 | Crigger ..................... 403/408.1 |
| 5,069,589 | A | * | 12/1991 | Lemke .......................... 411/533 |
| 5,546,723 | A | * | 8/1996 | Jones ............................. 52/698 |
| 6,367,216 | B1 | * | 4/2002 | Maylon ........................... 52/454 |
| 6,726,003 | B2 | * | 4/2004 | Itoh et al. ...................... 198/788 |

FOREIGN PATENT DOCUMENTS
FR    1300835 A    8/1962

* cited by examiner

*Primary Examiner* — Flemming Saether
(74) *Attorney, Agent, or Firm* — Howard & Howard Attorneys PLLC

(57) ABSTRACT

A device for attaching an element to a holder, the device including a screw having a body and a head, the screw body being able to pass through an opening of the element and to penetrate the holder, and a washer surrounding the screw body when the washer is inserted between the head of the screw and the element, characterized in that the washer comprises an external periphery and an internal periphery each having at least one protruding portion, each protruding portion being able to penetrate respectively the element and the holder to provide the attachment between the element and the holder. Also, an attachment method using such a device, and a front face with including device.

12 Claims, 1 Drawing Sheet

DEVICE FOR ATTACHING AN ELEMENT TO A HOLDER

CROSS-REFERENCES TO RELATED APPLICATIONS

The instant application claims priority to and all the benefits of International Application No. PCT/FR2005/003126 filed Dec. 14, 2005, with the World Intellectual Property Organization, and which claims priority to French Application No. 0413273 filed Dec. 14, 2004.

BACKGROUND OF THE INVENTION

1. Field of the Invention

The invention relates to a device for attaching an element to a holder.

More particularly, the invention relates to such a device of the type comprising a screw including a body and a head, intended to pass through an opening of the element and to penetrate the holder, and a washer intended to surround the screw while being inserted between the head of the screw and the element.

The invention particularly finds its application in the attachment of the headlights of a vehicle to a front face. A front face is a structural element likely to incorporate various items of equipment of a vehicle, such as headlights, indicator lights, audible warnings, heat exchanger, fan-motor group, or complete cooling module, etc.

The module, thus provided with its items of equipment, forms a unitary element prepared and delivered by the equipment supplier, ready to be mounted on the vehicle by the manufacturer. This unitary module is installed by connection to lateral structural elements of the vehicle, such as the chassis rails, wings or body shells, then installation of a bumper or front protective fender fitted to the module.

2. Description of the Related Art

The mounting of the headlights on a front face is usually a lengthy and costly process. Attachment is usually provided by self-tapping screws, in plastic bushes of the holder. In order to ensure that this assembly holds, anti-creep rings that are made of metal are usually added. On these rings, there are small teeth which plant themselves in the holder to increase the mechanical hold.

The mounting of the headlights comprises the following steps:
  mounting of the rings onto the headlight;
  crimping of the rings for a provisional hold;
  preparation of screws with captive washers;
  setting of the headlights with reference to the front face; and
  tightening.

The object of the invention is particularly to improve the situation.

BRIEF SUMMARY OF THE INVENTION

For this purpose the invention proposes a device for attaching an element to a holder comprising a screw including a body and a head, intended to pass through an opening of the element and to penetrate the holder, and a washer intended to surround the screw while being inserted between the head of the screw and the element. The washer comprises an external periphery and an internal periphery each having at least one protruding portion intended to penetrate respectively the element and the holder to provide the attachment.

Such an attachment device is particularly valuable in that it offers an excellent mechanical hold thanks to the respective penetration of the element and the holder via the protruding portions. This attachment device however remains extremely simple, since all that is required is to insert the washer between the head of the screw and the element as for a conventional screw.

In one embodiment, the internal periphery and the external periphery of the washer each comprise portions forming teeth to penetrate respectively the element and the holder.

In a first variant, the teeth may be formed by cut out and reshaped portions of the washer. In another variant, these teeth may be formed by the stamped portions of the washer. In yet another variant form, the internal periphery of the washer comprises a collar forming the protruding portion.

These variants make it possible to produce devices of varied attachment, offering different and effective technologies.

The invention also relates to a method of attaching an element to a holder, comprising the supply of a device as hereinabove, and also comprising the placement of the element relative to the holder, the mounting of the washer onto the screw, the mounting of this assembly through an opening of the element and into the holder and the tightening of the screw until a sufficient degree of attachment is achieved.

The invention also relates to a front face comprising a device for attaching an element to a holder as described above.

BRIEF DESCRIPTION OF THE DRAWINGS

Other features and advantages of the invention will better appear on reading the following illustrative and non-limiting description of examples based on the figures in the appended drawings in which.

DETAILED DESCRIPTION OF EXEMPLARY EMBODIMENT(S)

Figure 1:
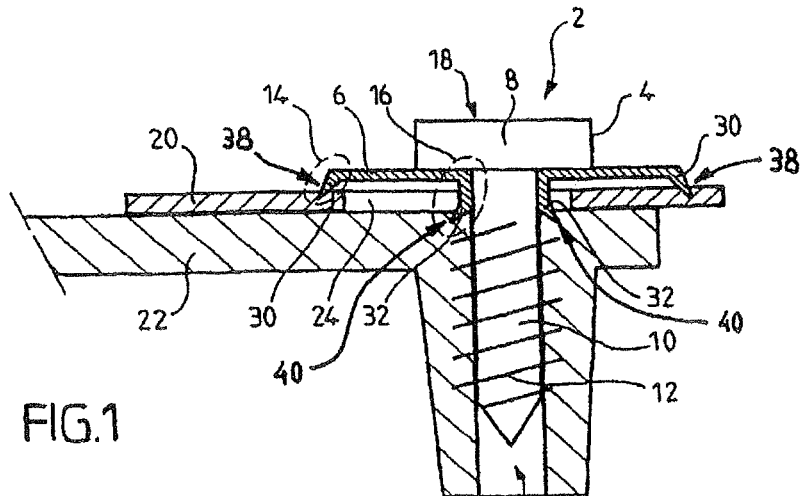
FIG. 1 represents a view in schematic section of a partial front face including an attachment device according to the invention.

As can be seen in FIG. 1, a device 2 according to the invention comprises a screw 4 and a washer 6. The screw 4 comprises a head 8 and a body 10 furnished with a thread or tapping 12. The washer 6 has a substantially annular shape and comprises an external periphery 14 and an internal periphery 16. The attachment device 2 is formed by the assembly of the screw 4 and the washer 6, the body 10 penetrating an opening 18 of the washer 6.

In order to attach an element 20 to a holder 22, the element 20 is placed on the holder 22 so that an attachment opening 24 of the element 20 is substantially opposite a receiving opening 26 of the holder 22. In the example described herein, the opening 24 is substantially larger than the opening 26. In practice, these two openings may be of substantially equal size.

In order to attach the element 20 to the holder 22, the device 2 comes to pass through the attachment opening 24 and penetrate the receiving opening 26. In order to ensure the mechanical hold of this assembly, the screw 8 is screwed into the opening 26, and the tapping provides a hold.

The external periphery 14 and internal periphery 16 of the washer 6 each comprise a pair of respective teeth 30 and 32 which will come to supplement the hold provided by the tapping 12. Specifically, the washer 6 is provided such that it covers the opening 24, irrespective of the position of this opening 24 relative to the opening 26. Thus, the head 8 of the screw 4 which presses on the washer 6 flattens the element 20 onto the holder 22.

In addition, the teeth 30 and 32 of the washer 6 are orientated respectively towards the element 20 and the holder 22, so that they penetrate them when the screw 4 is tightened. The element 20 is then therefore held attached to the holder 22 first by the pressure of the screw 4 on the washer 6 and, secondly, by the teeth 30 and 32 respectively penetrating the element 20 and the holder 22.

In addition, in order to simplify the mounting of the device, the washer is provided to have an internal diameter that is slightly less than the major diameter of the thread 12 formed on body 10 of the screw 4. It thus forms a washer called a captive washer which makes assembly easier. Practically, in a first step, the washer 6 is mounted on the body 10 and the former remains in place spontaneously thanks to this feature.

The attachment of the element 20 to the holder 22 therefore then consists of mounting the washer 6 on the screw 4, mounting this assembly through an opening 24 of the element and in the holder and tightening the screw 4 until a sufficient degree of attachment is achieved.

The teeth 30 and 32 may be formed by portions 38 and 40, respectively cut out of the external periphery 14 and internal periphery 16 of the washer 6 and then reshaped. These teeth 30, 32 may also be formed by local stamping of the external periphery 14 or internal periphery 16 of the washer 6.

Figure 2:
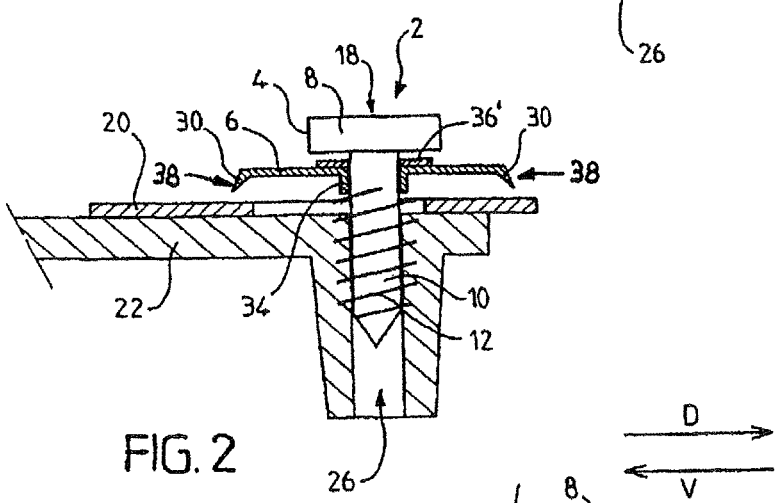
FIG. 2 represents a variant of the device of FIG. 1.

FIG. 2 shows a variant of FIG. 1 in which the teeth 32 are replaced by a collar 34 formed in the region of the internal periphery 16 of the washer 6. This collar 34 may in particular be produced by a stamping or a punching of the washer. Provision is made for this collar to be thinner than the material thickness of the washer. When the device 2 is mounted to provide the attachment, the collar 34 plays a role similar to that of the teeth 32.

The washer 6 also comprises a set of teeth or ridges 36 located between the top face of the washer and the head 8 of the screw 4. These ridges 36 are detailed in FIG. 3.

Figure 3:
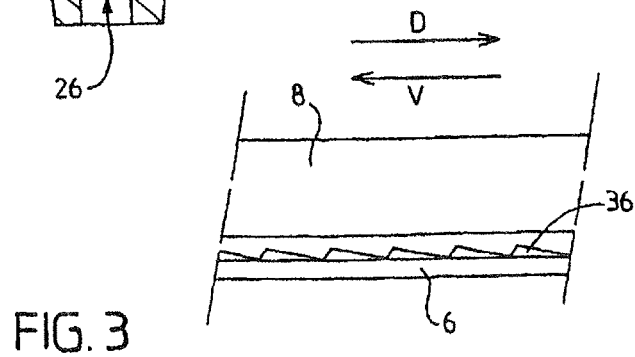
FIG. 3 is an enlargement of a portion of FIG. 1.

As can be seen in FIG. 3, the ridges 36 are such that a rotation of the head 8 in the direction of the arrow V is not hampered, whereas a rotation of the head 8 in the direction of the arrow D, once the screw 4 has been tightened, is impeded. Thus, once the screw has been mounted and tightened, the teeth 36 make loosening particularly difficult. The ridges 36 therefore make it possible to offer an improvement of the mechanical hold of the device 2, by preventing the screw 4 from loosening. In a particular variant, the ridges 36 can be replaced by a self-locked washer 36' (FIG. 2).

In these two embodiments, the respective height of the teeth 30 and 32 and that of the collar 34 may be modified as a function of the element 20 and the holder 22. Specifically, according to the depth of the opening 24 and the respective hardness of the element 20 and the holder 22, the variation in the respective height of the teeth 30 and 32 (and of the collar 34) makes it possible to choose whichever of the pairs of teeth will penetrate first and the depth of this penetration. By dimensioning these heights it is therefore possible to ensure that the teeth penetrate substantially at the same time, which provides a more precise attachment. Moreover, the control of these dimensions also makes it possible to limit any creep due to the penetration of the teeth 30 and 32 and of the collar 34 into the element 20 and the holder 22.

The description of the examples hereinabove is given as an illustration and is non-limiting and those skilled in the art will be able to envisage any possible variant, particularly on reading the following appended claims.

The invention claimed is:

1. In combination with an element having an opening, and a holder to which the element is attachable, the improvement which comprises:
    a device for attaching an element to a holder, said device comprising a screw having a body and a head, the screw body passing through the opening of the element and penetrating the holder, and a washer surrounding the screw body when the washer is inserted between the head of the screw and the element, characterized in that the washer comprises an external periphery and an internal periphery each having at least one protruding portion, each protruding portion penetrating respectively the element and the holder, the element and the holder attached to each other with said device.

2. A combination according to claim 1, characterized in that the screw body extends through the washer, and the washer has a captive connection relative to the screw.

3. A combination according to claim 1, characterized in that the external periphery of the washer comprises a plurality of teeth, each said tooth formed by a reshaped cut out portion of the washer and able to penetrate the element.

4. A combination according to claim 1, characterized in that the external periphery of the washer comprises a plurality of teeth, each said tooth formed by a locally stamped portion of the washer and able to penetrate the element.

5. A combination according to claim 1, characterized in that the internal periphery of the washer comprises a plurality of teeth, each said tooth formed by a reshaped cut out portion of the washer and able to penetrate the holder.

6. A combination according to claim 1, characterized in that the internal periphery of the washer comprises a plurality of teeth, each said tooth formed by a locally stamped portion of the washer and able to penetrate the holder.

7. A combination according to claim 1, characterized in that the internal periphery of the washer comprises a collar surrounding the body of the screw, said collar being able to penetrate the holder.

8. A combination according to claim 1, characterized in that the internal periphery of the washer comprises ridges facing the head of the screw, relative rotation between the screw and the inserted washer unhampered in a first direction, relative rotation between the tightened screw and the inserted washer impeded in the opposite direction, whereby loosening rotation of the tightened screw is prevented.

9. A combination according to claim 1, characterized in that the protruding portions of the internal periphery and of the external periphery of the washer have respective heights chosen in order to substantially simultaneously penetrate the holder and the element, respectively.

10. A combination according to claim 1, characterized in that the protruding portions of the internal periphery and of the external periphery of the washer have respective heights chosen in order to limit any creep due to their penetration in the element and the holder.

11. A method of attaching an element to a holder with a device, comprising:
    supplying a device including a screw having a body and a head, the screw body being able to pass through an opening of the element and to penetrate the holder, and a washer surrounding the screw body when the washer is inserted between the head of the screw and the element, the washer having an external periphery and an internal periphery each having at least one protruding portion,
    placing the element relative to the holder,
    mounting the device washer onto the device screw, mounting the device washer and screw assembly by inserting the screw body through an opening of the element and into the holder and tightening the device screw until a sufficient degree of attachment is achieved, and penetrating the element and the holder with the respective protruding portion of the device washer.

12. A front face, comprising:

a device for attaching an element to a holder, an element having an opening, and a holder, said device comprising a screw having a body and a head, the screw body being able to pass through the opening of the element and to penetrate the holder, and a washer surrounding the screw body and disposed between the head of the screw and the element, said washer comprising an external periphery and an internal periphery each having at least one protruding portion, each protruding portion being able to penetrate respectively the element and the holder to provide the attachment between the element and the holder, said element and said holder penetrated by said washer protruding portions, and attached to each other with said device.

* * * * *

UNITED STATES PATENT AND TRADEMARK OFFICE
CERTIFICATE OF CORRECTION

| | | |
|---|---|---|
| PATENT NO. | : 8,454,291 B2 | Page 1 of 1 |
| APPLICATION NO. | : 11/791426 | |
| DATED | : June 4, 2013 | |
| INVENTOR(S) | : Jean-Nicolas Guyomard | |

It is certified that error appears in the above-identified patent and that said Letters Patent is hereby corrected as shown below:

Title Page, Assignee, after "Valeo", delete "Systems" and replace with -- Systemes --

Signed and Sealed this
Sixteenth Day of September, 2014

Michelle K. Lee
*Deputy Director of the United States Patent and Trademark Office*